United States Patent
Lee et al.

(10) Patent No.: US 10,284,952 B2
(45) Date of Patent: May 7, 2019

(54) AUDIO PROCESSING APPARATUS AND CONTROL METHOD THEREOF

(71) Applicant: SAMSUNG ELECTRONICS CO., LTD., Suwon-si, Gyeonggi-do (KR)

(72) Inventors: Tae-hyung Lee, Suwon-si (KR); Dae-hyeon Lee, Seoul (KR); Chang-yong Heo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 162 days.

(21) Appl. No.: 15/417,484

(22) Filed: Jan. 27, 2017

(65) Prior Publication Data
US 2017/0238095 A1    Aug. 17, 2017

(30) Foreign Application Priority Data
Feb. 16, 2016  (KR) .................. 10-2016-0017892

(51) Int. Cl.
H04B 3/00       (2006.01)
H04R 3/12       (2006.01)
G06F 3/16       (2006.01)
H04S 3/00       (2006.01)
H04R 5/04       (2006.01)

(52) U.S. Cl.
CPC .............. *H04R 3/12* (2013.01); *G06F 3/162* (2013.01); *H04R 5/04* (2013.01); *H04S 3/002* (2013.01); *H04S 3/008* (2013.01)

(58) Field of Classification Search
CPC ...................................................... H04B 3/00
See application file for complete search history.

(56) References Cited

U.S. PATENT DOCUMENTS

| | | | |
|---|---|---|---|
| 4,766,602 A * | 8/1988 | Wilkinson | G11B 20/1262 327/161 |
| 5,889,820 A | 3/1999 | Adams | |
| 8,127,170 B2 | 2/2012 | Zhao et al. | |
| 8,848,849 B1 * | 9/2014 | Peters | G06F 13/4295 375/359 |
| 8,977,884 B2 | 3/2015 | Sridharan et al. | |
| 2005/0058158 A1 | 3/2005 | Miyamoto | |
| 2014/0285245 A1 | 9/2014 | Sahara | |

FOREIGN PATENT DOCUMENTS

| | | |
|---|---|---|
| JP | 2007-280584 | 10/2007 |
| JP | 2014-187557 | 10/2014 |
| KR | 10-2005-0076088 | 7/2005 |
| KR | 10-1055089 | 8/2011 |

* cited by examiner

Primary Examiner — Olisa Anwah
(74) Attorney, Agent, or Firm — Sughrue Mion, PLLC

(57) ABSTRACT

An audio processing apparatus and a control method thereof are provided. The method includes receiving an audio signal including audio data corresponding to each of a plurality of channels, generating a strobe signal for the audio data corresponding to each of the plurality of channels, converting a clock for the strobe signal corresponding to each of the plurality of channels to a master clock having preset multiple speeds, and outputting the audio signal based on the master clock. The simplification of the system configuration is accomplished by synchronizing an input and an output of the audio signal using hardware.

10 Claims, 5 Drawing Sheets

AUDIO PROCESSING APPARATUS AND CONTROL METHOD THEREOF

CROSS-REFERENCE TO RELATED APPLICATION

This application is based on and claims priority under 35 U.S.C. § 119 to Korean Patent Application No. 10-2016-0017892, filed on Feb. 16, 2016, in the Korean Intellectual Property Office, the disclosure of which is incorporated by reference herein in its entirety.

BACKGROUND

Field

The present disclosure relates generally to an audio processing apparatus and a control method thereof, and for example, to an audio processing apparatus which synchronizes an input and an output of a digital audio signal and a control method thereof.

Description of Related Art

General audio processing apparatuses may perform a series of processes to synchronize an input and an output of a digital audio signal as follows.

For example, in response to the digital audio signal being received from the outside, the audio processing apparatuses may calculate a sampling rate of the received digital audio signal and generate a master clock for determining an output timing of the digital audio signal based on the calculated sampling rate. The audio processing apparatus may output the digital audio signal based on the generated master clock.

The audio processing apparatus may compare a difference in the number of samples between frequency clocks of the input and output digital audio signals with a preset threshold value, adjust a parameter value for the master clock for determining the output timing of the digital audio signal in response to the difference in the number of samples being larger than the preset threshold value, and generate the master clock based on the adjusted parameter value. The audio processing apparatus may output the digital audio signal based on the master clock generated based on the adjusted parameter value.

The input and output of the digital audio signal may be synchronized through the series of processes.

However, due to complexity of the process in the above-described method for synchronizing the input and output of the digital audio signal in the related art, it is difficult to develop, maintain, and repair the entire system.

While the fine adjustment for the master clock in the related method for synchronizing the input and output of the digital audio signal is performed, a processor of the audio processing apparatus may not control operations of other apparatuses of the system, and thus the overall performance of the system may be degraded.

SUMMARY

Example embodiments of the present disclosure address the above disadvantages and other disadvantages not described above.

One or more example embodiments relate to an audio processing apparatus capable of easily developing, maintaining, and repairing a system through simplification of a synchronization process for an input and an output of a digital audio signal and a control method thereof.

One or more example embodiments relate to an audio processing apparatus capable of performing a synchronization process on an input and an output of a digital audio signal only using hardware and a control method thereof.

According to an aspect of an example embodiment, a method of controlling an audio processing apparatus is provided, the method including receiving an audio signal including audio data corresponding to each of a plurality of channels; generating a strobe signal for the audio data corresponding to each of the plurality of channels; converting a clock for the strobe signal corresponding to each of the plurality of channels to a master clock having multiple preset speeds; and outputting the audio signal based on the master clock.

The generating of the strobe signal may include generating a sampling clock from the received audio signal; performing parsing on metadata for determining the audio data corresponding to each of the plurality of channels from a pattern of the sampling clock; and generating the strobe signal corresponding to each of the plurality of channels based on the parsed metadata.

The converting may include converting the clock for the strobe signal corresponding to each of the plurality of channels to the master clock by upscaling a speed of the clock for the strobe signal corresponding to each of the plurality of channels to 256 times speed.

The audio signal may be a Sony Philips digital interface (SPDIF) input signal.

The audio data corresponding to each of the plurality of channels may be assigned as 32-bit data and metadata included in the audio data corresponding to each of the plurality of channels may be assigned as 4-bit data.

According to an aspect of an example embodiment, an audio processing apparatus is provided, including an audio signal receiver configured to receive an audio signal including audio data corresponding to each of a plurality of channels and to generate a strobe signal for the audio data corresponding to each of the plurality of channels; a clock controller configured to convert a clock for the strobe signal corresponding to each of the plurality of channels to a master clock having preset multiple speeds; and an audio signal output unit comprising audio output circuitry configured to output the audio signal based on the master clock.

The audio signal receiver may include a signal detector configured to generate a sampling clock from a received audio signal; a parsing unit comprising parsing circuitry configured to perform parsing on metadata for determining the audio data corresponding to each of the plurality of channels from a pattern of the sampling clock; and a strobe signal generator comprising strobe signal generating circuitry configured to generate the strobe signal corresponding to each of the plurality of channels based on the parsed metadata.

The clock controller may convert the clock for the strobe signal corresponding to each of the plurality of channels to the master clock by upscaling a speed of the clock for the strobe signal corresponding to each of the plurality of channels to 256 times speed.

The audio signal may be a Sony Philips digital interface (SPDIF) input signal.

The audio data corresponding to each of the plurality of channels may be assigned as 32-bit data and metadata included in the audio data corresponding to each of the plurality of channels may be assigned as 4-bit data.

According to various example embodiments, the audio processing apparatus may accomplish simplification of the system configuration by synchronizing the input and output of the audio signal using a hardware configuration.

The audio processing apparatus according to the example embodiment may simplify a complicated process such as a process of determining whether or not to adjust a parameter value for the master clock and thus improve the degradation of system performance by generating the master clock using the strobe signal corresponding to each of the plurality of channels parsed from the input digital audio signal.

Additional aspects and advantages of the example embodiments are set forth in the detailed description, and will be apparent from the detailed description.

BRIEF DESCRIPTION OF THE DRAWINGS

The above and/or other aspects, features and attendant advantages of the present disclosure will be more apparent and readily understood from the following detailed description, taken in conjunction with the accompanying drawings, in which like reference numerals refer to like elements, and wherein.

DETAILED DESCRIPTION

Figure 1:
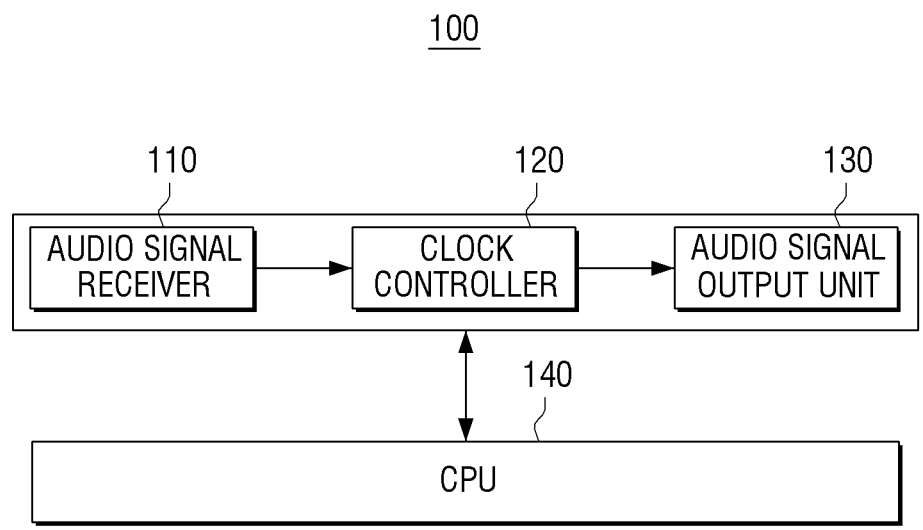
FIG. 1 is a block diagram illustrating an example general audio processing apparatus according to the related art.

A description of the disclosure and drawings will be provided before the detailed description of the disclosure is made.

As the terminology used herein is for the purpose of describing the disclosure and claims, general terms are selected in consideration of functions in various example embodiments. It will be understood that the terms used herein may be changed depending on the intention of the technician in the art to which this disclosure belongs, legal or technical interpretation, appearance of new technology, and the like. A portion of the terms used herein may be terms arbitrarily selected. It will be further understood that the terms used herein should be interpreted as the meaning defined herein. Unless otherwise defined, all terms including technical and scientific terms used herein have the same meaning as commonly understood by one of ordinary skill in the art to which this disclosure belongs.

In the following description, unless otherwise described, the same reference numerals or symbols are used for the same elements or components which substantially perform the same functions when they are depicted in different drawings. The same reference numerals or symbols are used to assist in a comprehensive understanding of other example embodiments. Thus, it is understood that a plurality of drawings may not illustrate one example embodiment even when all the elements denoted with the same reference numerals depicted in the plurality of drawings.

It will be understood that, although the terms first, second, etc. may be used herein in reference to elements of the disclosure regardless of an order and/or importance, such elements should not be understood as limited by these terms. The terms are used only to distinguish one element from other elements. For example, without departing from the spirit of the disclosure, a first element may refer to a second element, and similarly, the second element may refer to the first element.

As used herein, the singular forms "a," "an" and "the" are intended to include the plural forms as well, unless the context clearly indicates otherwise. It will be further understood that the terms "comprises" and/or "comprising," when used in this disclosure, specify the presence of stated features, integers, steps, operations, elements, components, and/or groups thereof, but do not preclude the presence or addition of one or more other features, integers, steps, operations, elements, components, and/or groups thereof.

In example embodiments, the term "module", "unit", or "part" may refer to an element which performs at least one function or operation and may be implemented with hardware, software, or a combination thereof "plurality of modules", "plurality of units", or "plurality of parts" may be implemented with at least one processor (not shown) by integrating the modules, units or parts as at least one module or chip other than "modules", "units", or "parts" which need to be implemented with separate specific hardware.

It will be understood that when an element (for example, a first element) is referred to as being "coupled with/to" or "connected to" another element (for example, a second element), it can be directly connected or coupled to the other element or intervening elements (for example, third elements) may be present. Unless otherwise described, any portion including any element may refer to the portion further including other elements not excluding the other elements.

Hereinafter, various example embodiments will be described in greater detail with reference to the accompanying drawings.

First, audio processing apparatus and method in the related art will be schematically described before audio processing apparatus and method according to an example embodiment are described.

FIG. 1 is a block diagram illustrating an example general audio processing apparatus according to the related art.

As illustrated in FIG. 1, an audio processing apparatus 100 in the related art may include an audio signal receiver 110, a clock controller 120, an audio signal output unit 130, and a central processing unit (CPU) 140.

In response to a digital audio signal being received from the outside, the audio signal receiver 110 may calculate a sampling rate of the received digital audio signal.

The clock controller 120 may generate a master clock for determining an output timing of the digital audio signal based on the sampling rate of the received digital audio signal and output the generated master clock to the audio signal output unit 130.

The audio signal output unit 130 may output the digital audio signal based on the master clock output from the clock controller 120.

The CPU 140 may set an initial value of a parameter for the master clock for determining the output timing of the digital audio signal based on the sampling rate of the received digital audio signal. The CPU 140 may determine whether or not to perform fine adjustment on the master clock by monitoring the digital audio signal received through the audio signal receiver 110 and the digital audio signal output through the audio signal output unit 130.

For example, the CPU 140 may compare a difference in the number of samples between a frequency clock of the digital audio signal received through the audio signal receiver 110 and a frequency clock of the digital audio signal output through the audio signal output unit 130 with a preset threshold value. In response to the difference in the number of samples being larger than the preset threshold value as a comparison result, the CPU 140 may adjust the parameter value for the master clock for determining the output timing of the digital audio signal.

In this example, the audio signal receiver 110 may extract audio data for each of the plurality of channels using metadata included in the received digital audio signal and calculate a sampling rate for the extracted audio data for each of the plurality of channels.

In response to the sampling rate for the received digital audio signal being calculated, the CPU 140 may calculate frequency for the master clock to be used in the audio signal output unit 130 using the calculated sampling rate.

The master clock may be a synchronous signal for synchronizing a timing for receiving the digital audio signal through the audio signal receiver 130 and a timing for outputting the digital audio signal through the audio signal output unit 130.

In response to the frequency of the master clock for outputting the digital audio signal being calculated, the CPU 140 may set an initial parameter value based on calculated frequency information and output the set initial parameter value to the clock controller 120. The clock controller 120 may generate the master clock for determining the output timing of the digital audio signal based on the initial parameter value output from the CPU 140 and output the generated master clock to the audio signal output unit 130.

Accordingly, the audio signal output unit 130 may output the digital audio signal based on the master clock output from the clock controller 120.

After the CPU 140 outputs the initial parameter value to the clock controller 120, the CPU 140 may determine whether or not to perform fine adjustment on the master clock by monitoring the digital audio signal received through the audio signal receiver 110 and the digital audio signal output through the audio signal output unit 130.

For example, the CPU 140 may compare the difference in the number of samples between the frequency clock of the digital audio signal received through the audio signal receiver 110 and the frequency clock of the digital audio signal output through the audio signal output unit 130 with a preset threshold value. In response to the difference in the number of samples being larger than the preset threshold value as a comparison result, the CPU 140 may adjust a parameter value for the master clock for determining the output timing of the digital audio signal and output the adjusted parameter value to the clock controller 120.

Accordingly, the clock controller 120 may regenerate the master clock based on the parameter value adjusted through the CPU 140 and the audio signal output unit 130 may output the digital audio signal based on the master clock regenerated through the clock controller 120.

The input and output of the digital audio signal may be synchronized through a series of processes.

However, the series of processes for synchronizing the input and output of the digital audio signal performed in the audio processing apparatus 100 in the related art may be complicated and may affect the system performance due to the complexity. For example, while the fine adjustment for the master clock in the related method is performed, the CPU 140 may not control operations of other apparatuses constituting the system, and thus the overall performance of the system may be degraded.

Hereinafter, an audio processing apparatus 200 according to an example embodiment will be described in greater detail below.

Figure 2:
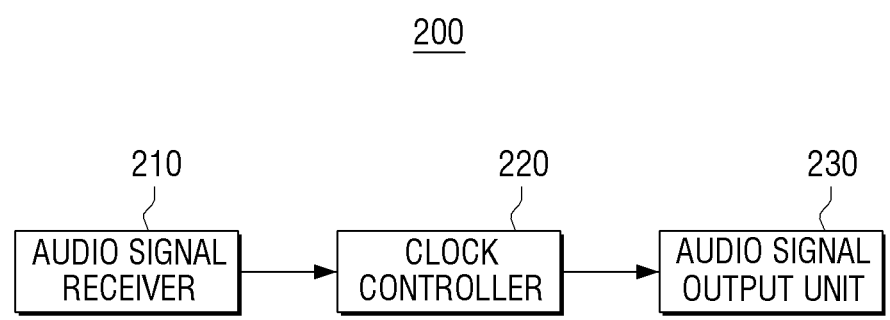
FIG. 2 is a block diagram illustrating an example audio processing apparatus according to an example embodiment.

FIG. 2 is a block diagram illustrating an example audio processing apparatus according to an example embodiment.

As illustrated in FIG. 2, the audio processing apparatus 200 may include an audio signal receiver (e.g., including various audio circuitry) 210, a clock controller (e.g., including processing circuitry) 220, and the audio signal output unit (e.g., including audio output circuitry) 230.

The audio signal receiver 210 may include various audio circuitry configured to receive an audio signal including audio data corresponding to each of a plurality of channels and to generate a strobe signal for the audio data corresponding to each of the plurality of channels.

The audio signal may, for example, be a Sony Philips digital interface (SPDIF) format input signal. The audio data corresponding to each of the plurality of channels included in the input audio signal may be assigned as 32-bit data and the metadata included in the audio data corresponding to each of the plurality of channels may be assigned as 4-bit data. The audio data corresponding to each of the plurality of channels may further include additional data for performing an operation such as error check and the additional data may be assigned as 4-bit data.

The clock controller 220 may include various circuitry configured to convert a clock for the strobe signal corresponding to each of the plurality of channels to a master clock having preset multiple speed.

The audio signal output unit 230 may include various audio output circuitry configured to output an audio signal based on the master clock converted through the clock controller 220.

Figure 3:
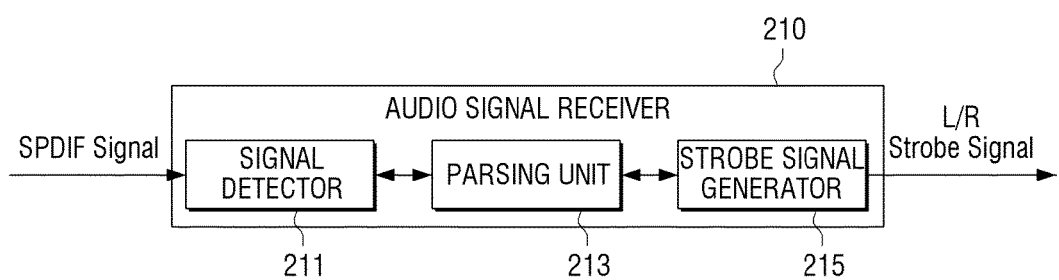
FIG. 3 is a block diagram illustrating an example audio signal receiver according to an example embodiment.

The audio signal receiver 210 may have the same or similar configuration as illustrated in FIG. 3.

FIG. 3 is a block diagram illustrating an example audio signal receiver according to an example embodiment.

As illustrated in FIG. 3, the audio signal receiver 210 may include various audio circuitry, such as, for example, and without limitation, a signal detector 211, a parsing unit 213, and a strobe signal generator 215.

The signal detector 211 may include various circuitry and may generate a sampling clock from the audio signal received from the outside and output the generated sampling clock to the parsing unit 213.

The parsing unit 213 may include various circuitry configured to perform parsing on metadata for determining audio data corresponding to each of the plurality of channels from a pattern of the sampling clock for the audio signal output from the signal detector 211.

The strobe signal generator 215 may include various circuitry configured to generate the strobe signal corresponding to each of the plurality of channels based on the metadata parsed through the parsing unit 213.

In response to the strobe signal corresponding to each of the plurality of channels being generated, the clock controller 220 may convert a clock for the strobe signal corresponding to each of the plurality of channels to a master clock having preset multiple speeds.

In an example embodiment, the clock controller 220 may convert the clock for the strobe signal corresponding to each of the plurality of channels to the master clock by upscaling a speed of the clock for the strobe signal corresponding to each of the plurality of channels to 256 times speed.

For example, in response to a sampling frequency fs of an input audio signal (hereinafter, referred to as digital audio signal) being 44.1 KHz, the audio data corresponding to each of the plurality of channels included in the digital audio signal may be configured of 32-bit data. In this example, in response to the plurality of channels being a left (L) channel and a right (R) channel, the audio data corresponding to each of the L channel and the R channel may be configured of 32-bit data. The audio data corresponding to each of the L channel and the R channel may include 4-bit metadata.

In response to the digital audio signal having the sampling frequency fs of 44.1 KHz being input, the signal detector 211 may generate the sampling clock from the sampling frequency fs of the input digital audio signal using a sample clock.

The parsing unit 213 may perform parsing on the metadata for determining the audio data corresponding to each of the plurality of channels by analyzing a pattern of the sampling clock generated from the sampling frequency of the digital audio signal. The metadata may be data for detecting the strobe signal from the audio data for each of the plurality of channels included in the digital audio signal.

For example, in response to the audio data corresponding to each of the L channel and the R channel being included in the digital audio signal, the parsing unit 213 may perform parsing on the metadata for detecting the strobe signal for each of the L and R channels included in the digital audio signal by analyzing the pattern of the sampling clock generated from the digital audio signal.

The strobe signal generator 215 may generate the strobe signal for each of the L and R channels from the audio data corresponding to each of the L and R channels included in the digital audio signal based on the metadata parsed through the parsing unit 213.

The strobe signal generator 215 may output the strobe signal for each of the L and R channels generated from the digital audio signal to the clock controller 220.

The clock controller 220 may convert the clock for the strobe signal corresponding to each of the L and R channels to the master clock by upscaling speed of the clock for the strobe signal corresponding to each of the L and R channels output from the strobe signal generator 215 to 256 times speed.

The audio signal output unit 230 may output the digital audio signal based on the master clock converted through the clock controller 220. For example, the audio signal output unit 230 may output the digital audio signal with 256 times faster speed than the clock of the strobe signal corresponding to each of the L and R channels included in the input digital audio signal based on the master clock.

The audio processing apparatus 200 according to an example embodiment may accomplish the simplification of the system configuration as compared with the audio processing apparatus 100 in the related art by synchronizing the input and output of the audio signal using hardware.

The audio processing apparatus 200 according to an example embodiment may simplify the complicated process such as a process of determining whether or not to perform fine adjustment on the parameter value for the master clock in the audio processing apparatus 100 in the related art and thus improve the degradation of system performance by generating the master clock using the strobe signal corresponding to each of the plurality of channels parsed from the input digital audio signal.

Up to now, the configuration of the audio processing apparatus 200 according to an example embodiment has been described in detail. Hereinafter, a method of controlling the audio processing apparatus 200 according to an example embodiment will be described in greater detail.

Figure 4:
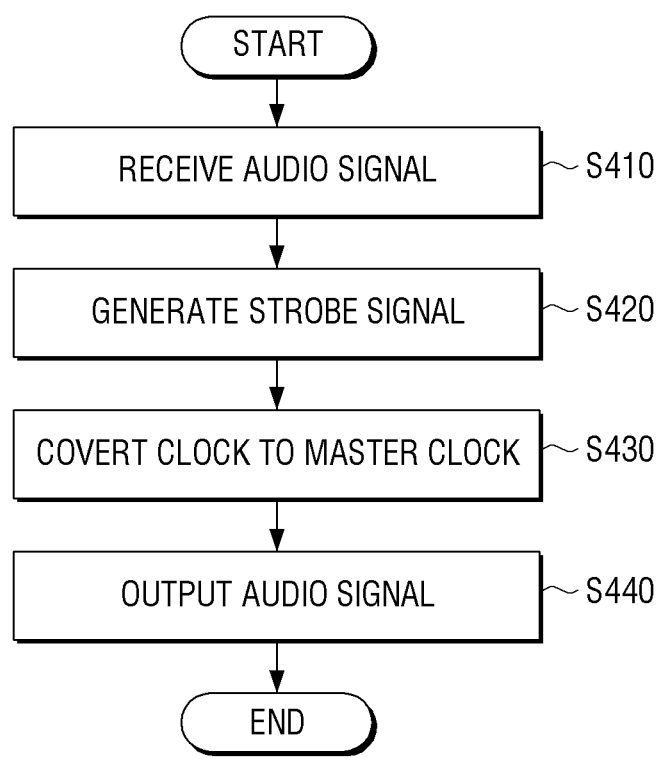
FIG. 4 is a flowchart illustrating an example method for synchronizing an input and an output of an audio signal in an audio processing apparatus according to an example embodiment.

FIG. 4 is a flowchart illustrating an example method of synchronizing an input and an output of an audio signal in an audio processing apparatus according to an example embodiment.

As illustrated in FIG. 4, the audio processing apparatus 200 may receive an audio signal including audio data corresponding to each of the plurality of channels (S410).

The audio processing apparatus 200 may generate the strobe signal for the audio data corresponding to each of the plurality of channels included in the received audio signal (S420).

The audio processing apparatus 200 may convert the clock for the strobe signal corresponding to each of the plurality of channels to the master clock having preset multiple speeds and output the audio signal based on the converted master clock (S430 and S440).

The input audio signal may, for example, be a Sony Philips digital interface (SPDIF) format input signal.

The audio data corresponding to each of the plurality of channels included in the input audio signal may be assigned as 32-bit data and the metadata included in the audio data corresponding to each of the plurality of channels may be assigned as 4-bit data. The audio data corresponding to each of the plurality of channels may further include additional data for performing an operation such as error check and the additional data may be assigned as 4-bit data.

In operation S420, the audio processing apparatus 200 may generate the strobe signal for the audio data corresponding to each of the plurality of channels included in the audio signal through the following example process.

Hereinafter, an example method of generating the strobe signal for the audio data corresponding to each of the plurality of channels included in the audio signal in the audio processing apparatus 200 according to an example embodiment will be described in greater detail.

Figure 5:
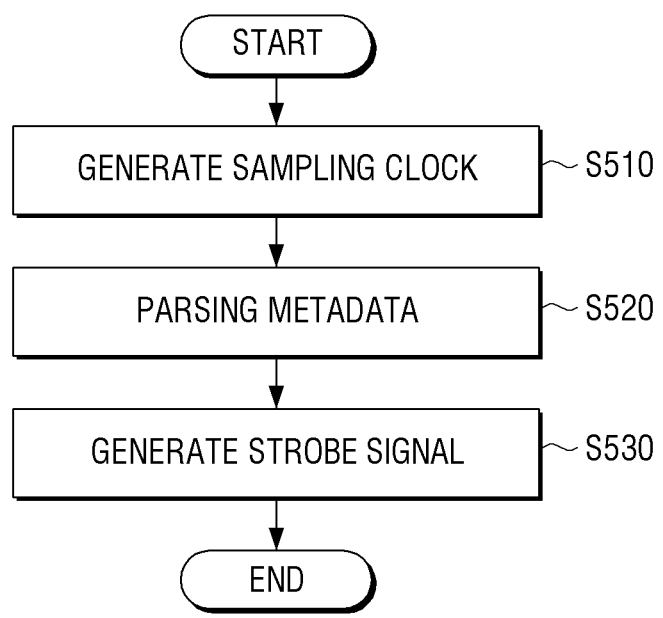
FIG. 5 is a flowchart illustrating an example process of generating a strobe signal for audio data corresponding to each of a plurality of channels in an audio processing apparatus according to an example embodiment.

FIG. 5 is a flowchart illustrating an example process of generating a strobe signal for audio data corresponding to each of a plurality of channels in an audio processing apparatus according to an example embodiment.

As illustrated in FIG. 5, the audio processing apparatus 200 may generate a sampling clock from a received audio signal (S510). The audio processing apparatus 200 may perform parsing on metadata for determining audio data corresponding to each of the plurality of channels included in the received audio signal from a pattern of a sampling clock (S520).

The audio processing apparatus 200 may generate a strobe signal from the audio data corresponding to each of a plurality of channels included in the received audio signal based on the parsed metadata (S530).

In response to the strobe signal corresponding to each of the plurality of channels being generated, the audio processing apparatus 200 may convert the clock for the strobe signal corresponding to each of the plurality of channels to the master clock having preset multiple speeds.

In an example embodiment, the audio processing apparatus 200 may convert the clock for the strobe signal corresponding to each of the plurality of channels to the master clock by upscaling a speed of the clock for the strobe signal corresponding to each of the plurality of channels to 256 times speed.

For example, in response to a sampling frequency fs of an input audio signal (that is, digital audio signal) being 44.1 KHz, audio data corresponding to each of the plurality of channels included in the digital audio signal may be configured of 32-bit data. In this example, in response to the plurality of channels being a left (L) channel and a right (R)

channel, the audio data corresponding to each of the L channel and the R channel may be configured of 32-bit data. The audio data corresponding to each of the L channel and the R channel may include 4-bit metadata.

In response to the digital audio signal having the sampling frequency fs of 44.1 KHz being input, the audio processing apparatus 200 may generate a sampling clock from the sampling frequency fs of the input digital audio signal using a sample clock.

The audio processing apparatus 200 may perform parsing on the metadata for determining the audio data corresponding to each of the plurality of channels by analyzing a pattern of the sampling clock generated from the sampling frequency of the digital audio signal. The metadata may be data for detecting the strobe signal from the audio data for each of the plurality of channels included in the digital audio signal.

For example, in response to the audio data corresponding to each of the L channel and the R channel being included in the digital audio signal, the audio processing apparatus 200 may perform parsing on the metadata for detecting the strobe signals for each of the L and R channels included in the digital audio signal by analyzing the pattern of the sampling clock generated from the digital audio signal.

The audio processing apparatus 200 may generate the strobe signal for each of the L and R channels from the audio data corresponding to each of the L and R channels included in the digital audio signal based on the parsed metadata.

The audio processing apparatus 200 may convert the clock for the strobe signal corresponding to each of the L channel and the R channel to the master clock by upscaling speed of the clock for the strobe signal corresponding to each of the L and R channels generated from the digital audio signal to 256 times speed.

The audio processing apparatus 200 may output the digital audio signal based on the master clock. For example, the audio processing apparatus 200 may output the digital audio signal with 256 times faster speed than the clock of the strobe signal corresponding to each of the L and R channels included in the input digital audio signal based on the master clock.

The audio processing apparatus 200 according to an example embodiment may accomplish simplification of the system configuration as compared with the audio processing apparatus 100 in the related art by synchronizing the input and output of the audio signal using hardware.

The audio processing apparatus 200 according to an example embodiment may simplify the complicated process such as a process of determining whether or not to perform fine adjustment on the parameter value for the master clock in the audio processing apparatus 100 in the related art and thus improve the degradation of system performance by generating the master clock using the strobe signal corresponding to each of the plurality of channels parsed from the input digital audio signal.

The above-described methods of an audio processing apparatus according to various example embodiments may be coded with software and may be stored in a non-transitory readable medium. The non-transitory readable medium may be installed and used in various apparatuses.

The non-transitory readable medium is an apparatus-readable medium configured to permanently or semi-permanently store data. For example, the non-transitory apparatus-readable medium may include a compact disc (CD), a digital versatile disc (DVD), a hard disc, a Blu-ray disc, a universal serial bus (USB), a memory card, a read only memory (ROM), and the like.

The foregoing example embodiments and advantages are merely examples and are not to be construed as limiting the present disclosure. The present teaching can be readily applied to other types of apparatuses. Also, the description of the example embodiments of the present disclosure is intended to be illustrative, and not to limit the scope of the claims, and many alternatives, modifications, and variations will be apparent to those skilled in the art.

What is claimed is:

1. A method of controlling an audio processing apparatus, the method comprising:
   receiving an audio signal including audio data corresponding to each of a plurality of channels;
   generating a strobe signal for the audio data corresponding to each of the plurality of channels;
   converting a clock for the strobe signal corresponding to each of the plurality of channels to a master clock having preset multiple speeds by upscaling a speed of the clock for the strobe signal; and
   outputting the audio signal based on the master clock.

2. The method as claimed in claim 1, wherein the generating of the strobe signal includes:
   generating a sampling clock from the received audio signal;
   parsing metadata included in the audio signal for determining the audio data corresponding to each of the plurality of channels from a pattern of the sampling clock; and
   generating the strobe signal corresponding to each of the plurality of channels based on the parsed metadata.

3. The method as claimed in claim 1, wherein the converting includes converting the clock for the strobe signal corresponding to each of the plurality of channels to the master clock by the upscaling of the speed of the clock for the strobe signal corresponding to each of the plurality of channels to 256 times speed.

4. The method as claimed in claim 1, wherein the audio signal comprises a Sony Philips digital interface (SPDIF) input signal.

5. The method as claimed in claim 1, wherein the audio data corresponding to each of the plurality of channels is 32-bit data and metadata included in the audio data corresponding to each of the plurality of channels is 4-bit data.

6. An audio processing apparatus comprising:
   an audio signal receiver configured to receive an audio signal including audio data corresponding to each of a plurality of channels and to generate a strobe signal for the audio data corresponding to each of the plurality of channels;
   a clock controller configured to convert a clock for the strobe signal corresponding to each of the plurality of channels to a master clock having preset multiple speeds by upscaling a speed of the clock for the strobe signal; and
   an audio signal output unit comprising audio output circuitry configured to output the audio signal based on the master clock.

7. The audio processing apparatus as claimed in claim 6, wherein the audio signal receiver includes:
   a signal detector comprising signal detecting circuitry configured to generate a sampling clock from a received audio signal;
   a parsing unit comprising parsing circuitry configured to perform parsing on metadata included the received audio signal to determine the audio data corresponding to each of the plurality of channels from a pattern of the sampling clock; and a strobe signal generator comprising circuitry configured to generate the strobe signal corresponding to each of the plurality of channels based on the parsed metadata.

8. The audio processing apparatus as claimed in claim 6, wherein the clock controller is configured to convert the clock for the strobe signal corresponding to each of the plurality of channels to the master clock by the upscaling of the speed of the clock for the strobe signal corresponding to each of the plurality of channels to 256 times speed.

9. The audio processing apparatus as claimed in claim 6, wherein the audio signal comprises a Sony Philips digital interface (SPDIF) input signal.

10. The audio processing apparatus as claimed in claim 6, wherein the audio data corresponding to each of the plurality of channels is 32-bit data and metadata included in the audio data corresponding to each of the plurality of channels is 4-bit data.

\* \* \* \* \*